United States Patent

[11] 3,581,917

[72] Inventors Edward W. Fundahn
 Algonquin;
 Ronald K. Krause, Crystal Lake, Ill.
[21] Appl. No. 845,151
[22] Filed July 28, 1969
[45] Patented June 1, 1971
[73] Assignee A. O. Smith Harvestore Products, Inc.
 Arlington Heights, Ill.

[54] DISPOSABLE BOTTOM UNLOADER SHIELD
 6 Claims, 7 Drawing Figs.
[52] U.S. Cl. .................................................. 214/17,
 99/235
[51] Int. Cl. ..................................................... B65g 65/42,
 B65g 65/46
[50] Field of Search .......................................... 214/17.8,
 17.82; 99/235(S)

[56] References Cited
UNITED STATES PATENTS
| | | | |
|---|---|---|---|
| 2,863,576 | 12/1958 | Trask ........................... | 214/17 |
| 2,955,720 | 10/1960 | Jones ........................... | 214/17 |
| 3,063,585 | 11/1962 | Bruecker ....................... | 214/17X |

Primary Examiner—Robert G. Sheridan
Attorney—Andrus, Sceales, Starke & Sawall

ABSTRACT: The disposable bottom unloader shield consists of a shield of an edible or neutral material, so that animals can digest it or it will assimilate with the stored material, having a configuration of a shape to provide a void in the bottom of a silo so that a bottom unloader can easily be started or inserted beneath the shield after the silo has been filled. An example of such a shield would be one of the general shape of a hat placed over a flail-type unloader which is coiled upon itself around a central drive shaft, and which would be destroyed by the flail after startup.

PATENTED JUN 1 1971

3,581,917

Inventors
Edward W. Fundahn
Ronald K. Krause
By
Andrus, Sceales, Starke, & Sawall
Attorneys

DISPOSABLE BOTTOM UNLOADER SHIELD

SUMMARY OF THE INVENTION

The purpose of the present invention is to establish either an arch or a void in the material stored in a silo at the floor level to enable the entry of a mechanical unloader within the bottom of the structure or the startup of a flail-type unloader coiled around a drive shaft in the bottom of a silo.

The Jones U.S. Pat. No. 2,955,720 is fairly representative of the prior art. In that patent, there is disclosed a chain-type bottom unloader, the discharge unit of which lies in a discharge trough provided in the floor of a silo and has a cutter arm which is rotated around the bottom of the silo with a rotating endless chain on it which dislodges the material and moves it to the center of the silo for discharge by the discharge unit. The Jones patent shows a metal hood or cover which overlies the trough, but is of a width so that an unloader cannot be located in the trough during filling since the cutter arm of the unloader is of a width to extend beyond the sides of the trough a substantial distance. Upon filling of the structure an arch over the trough is established and the metal hood is removed. The removal of the hood has created some problems since in some cases, this has been found difficult to accomplish.

The present invention, therefore, replaces the metal hood with a hood or shield which will protect the unloader during filling, but which need not be removed but rather is destroyed by the unloader when the latter is started in operation. The hood or shield of the invention is of a material that makes it suitable for digestion by animals if forage-type material is stored in the structure and is of a width so that it can accommodate the cutter arm of a chain-type unloader during filling. The shield of the invention takes various shapes depending on the type of unloader with which the shield is used. It is contemplated for example that it can be employed with the chain-type unloader shown and described in Jones U.S. Pat. No. 2,955,720 or with an auger-type unloader. In such use, the shield would be elongated to extend coextensively with the unloaders described. In use with a flail-type unloader, the shield is cylindrical or hemispherical in shape and appears somewhat like a hat or a beehive.

Bruecker U.S. Pat. No. 3,063,585 illustrates a disposable silage discharge chute, but is not directed to the problem of protecting bottom unloaders during filling.

Figure 1:
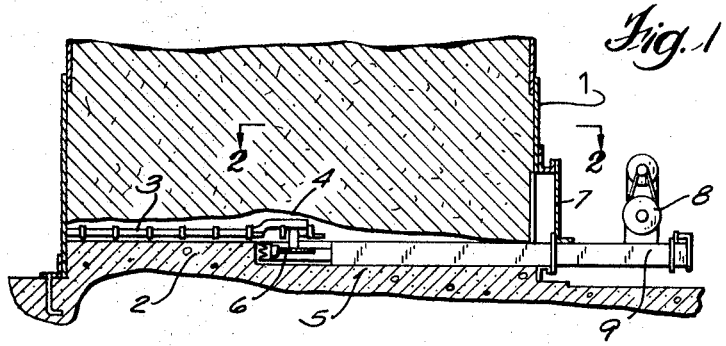
FIG. 1 is a fragmentary side elevation of a storage structure with a chain-type unloader located in the bottom of the structure.

Referring to the drawing, there is illustrated a substantially airtight storage structure or silo 1 which rests on the floor or foundation 2 and is adapted to store animal fodder, such as haylage and silage or industrial material, such as wood chips, or the like.

As illustrated in FIG. 1, the stored material is removed from the bottom of the silo by a chain-type unloader which has a cutter arm 3 driven from a central shaft 4 in a circular path around the bottom of the structure and carrying an endless chain for dislodging material. The dislodged material is deposited by the cutter arm 3 in a radially extending trough 5 provided in floor 2 and a conveyor 6 located in the trough discharges the material to the exterior of the structure.

The conveyor 6 extends through an opening in the wall of the storage unit which is sealed by the door 7. The conveyor 6 and cutter arm 3 and its associated chain are driven by the power unit 8 located on the outer extension 9 of the conveyor unit.

Figure 2:
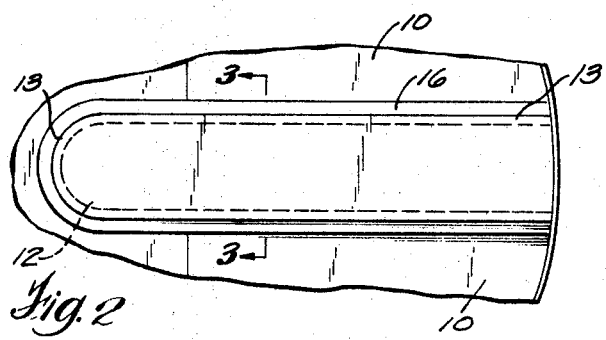
FIG. 2 is a fragmentary sectional view taken on line 2-2 of FIG. 1 with the unloader removed and the shield of the invention in place over the trough which is shown in dotted lines.
Figure 3:
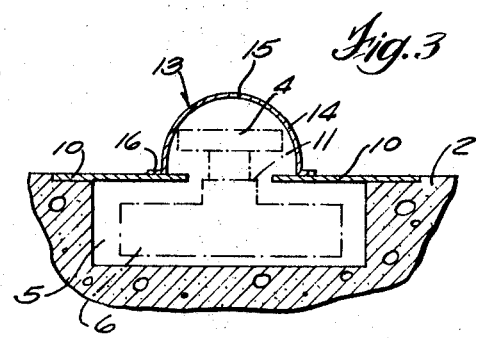
FIG. 3 is a section taken on line 3-3 of FIG. 2 with the unloader parts shown in phantom.

In FIGS. 2 and 3, there is shown a pair of floor plates 10 which are inset within the floor 2 and project over the trough 5, but are spaced to provide a clearance 11 which extends radially of the floor 2. The clearance 11 permits the drive shaft 4 to pass through the trough 5 when the cutter arm 3 overlies the conveyor 6 as the unloader is pushed through the trough into the storage structure. In addition, the plates 10 do not extend to the center of the storage structure to provide a central opening 12 for discharge of stored material.

The use of the invention permits the unloading unit comprising the cutter arm 3 and the conveyor 6 to be positioned within the silo during filling or to be easily entered into the trough 5 after filling.

The invention consists of a shield 13, illustrated in FIGS. 2 and 3, which extends the length of the trough 5 from the wall of storage structure 1 and slightly beyond the central opening 12 so that the trough and central opening 12 are completely shielded against passage of material thereto during filling. The shield 13 has half-round sidewalls 14, a similarly rounded top 15 and a flange 16 which extends along the sides of the shield and around the inner end. The inner portion of flange 16 of the shield 13 rests on floor 2 and the elongated portions of flange 16 are supported on floor plates 10. The shield 13 is of a height to fit over cutter arm 3 and may be corrugated, not shown, in its top 15 and sidewalls 14 to give it the necessary structural strength to withstand the weight of the stored material which may rest thereon. The half-rounded sidewalls and top likewise provide strength in the shield 13.

The shield 13 is of a material which can blend without objection into the stored matter when the unloader is placed in operation. Thus, if the stored material consists of silage, or other fodder, to be fed to animals, the shield is molded of an edible material which the animals can readily digest. Thus, the material may be of molded paperboard and molasses, or a variety of cellulose or fibrous type materials, such as peat moss, wood shavings impregnated with black strap molasses, or similar bonding agent. Ruminant animals can easily digest such materials.

The shield 13 provides a void in the stored material and in fact effects arching to that when the cutter arm 3 is started up, it has an area to operate in and is not jammed by the material with which the structure has been filled. When the cutter arm 3 is started to accomplish unloading, it readily cuts up the shield 13 and discharges the material of the shield into the trough for discharge by conveyor 6.

Figure 4:
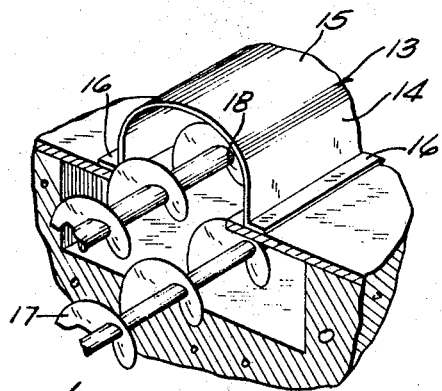
FIG. 4 is a perspective view of the trough in the floor of the structure with the shield in place over the cutter and discharge members of an auger-type bottom unloader.

FIG. 4 illustrates a similar type shield 13 employed with an auger-type unloader consisting of the discharge conveyor auger 17 disposed in the trough 5 and the dislodging auger 18 located above auger 17 and ready to be placed in operation. The construction of shield 13 is the same as that described with respect to the cutter-type unloader shown in FIGS. 1—3 and requires no separate description. The cutter arm 3 could, of course, be substituted for auger 18 and used in combination with discharge conveyor auger 17.

Figure 6:
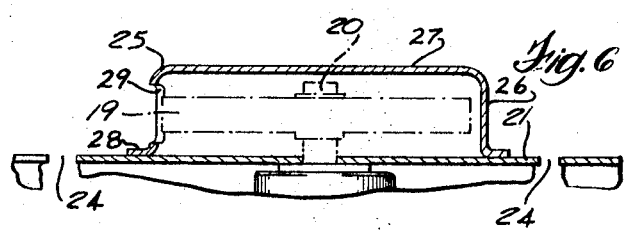
FIG. 6 is a view taken on line 6-6 of FIG. 5.
Figure 5:
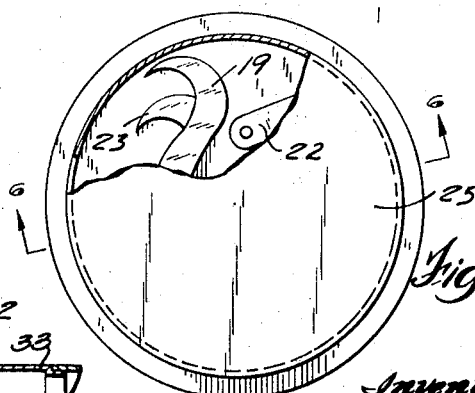
FIG. 5 is a top plan view of a flail-type unloader enclosed within a disposable shield which has been partly broken away.

In connection with the use of the invention with a flail-type unloader, reference may be made to FIGS. 5 and 6. There is shown a flail-type unloader 19 driven from a central shaft 20 which extends upwardly through the floor 21 of a storage structure, not shown.

Unloader 19 may be formed from heavy cantilevered tractor chain having the connecting links 22 and a cutter member 23 secured to the outer end. The unloader is rigid in a vertical direction and flexible in a horizontal direction. As the unloader 19 is operated, it moves outwardly under centrifugal force and dislodges stored material and discharges it through openings 24 in floor 21. When the silo has been emptied of stored material the unloader 19 wraps itself around shaft 20 as illustrated in the drawings.

The shield 25 is then placed over the shaft 20 and coiled unloader 19 preparatory to refilling the structure. The shield in this usage of it is circular in shape, of a diameter or size to cover the coiled unloader 19 and of a height to extend over the top of shaft 20. It is of the same material as that described in connection with the cutter-type unloader. The shield 25 has a circular sidewall 26 and a top 27. It is supported on a flange or flat rim 28 which extends around the shield at the bottom and rests on floor 21. The top 27 of shield 25 may be corrugated or the like to give it additional strength and openings 29 may be provided in sidewall 26 adjacent rim 28 so that when the flail unloader 19 is started, the cutter 23 can more readily engage the shield 25 and cut it away.

Figure 7:
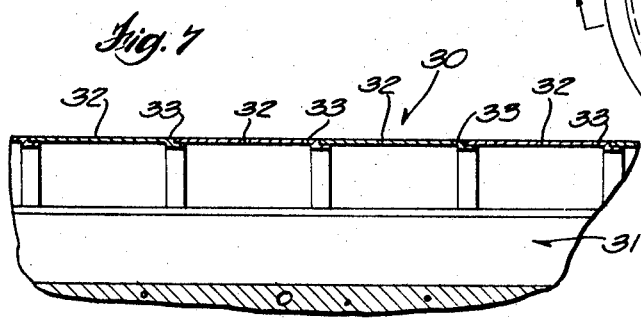
FIG. 7 is a side elevational view partly in section of an elongated unloader shield provided from a plurality of sections.

In FIG. 7, there is shown an elongated shield 30 which would be used with the cutter arm 3 or auger 18 type of unloader units. The shields 30 has the same rounded cross section and supporting flange as does shield 13 and overlies trough 31. In addition, instead of being in one piece, shield 30 is made up of a plurality of sections 32 which are interlocked together at joints 33. By employing a plurality of sections, the shield may be readily usable in structures of different diameters.

With the use of the disposable shield of the invention described in connection with various types of unloaders, a void is provided in the stored material to prevent jamming of the unloader and permitting ready startup without the requirement of a high starting torque. In addition, with chain and auger-type unloaders, not only are these unloaders installed easier but safety in use of the unloaders is immeasurably increased since the unloaders may be installed by merely pushing them into the unloader trough without the necessity that any part be moving as is the case if the unloader must work its way through the stored material.

Furthermore, in connection with the cutter and auger-type unloaders, it has in some cases been found desirable to initially cut out and discharge a portion of the stored material with a shorter cutter arm or auger. When this is completed a longer arm or auger is installed. Consequently, the changeover from a short arm or auger to a longer arm or auger would be facilitated by the use of the disposable shield of the invention due to the uncut portion of the shield which would overlie the trough adjacent to the door of the storage structure. Thus, solidly packed material would not have to be cut out in order to get at the short cutter arm to remove it and replace it with a longer arm. Rather with the cutter arm disposed in line with and immediately above the discharge unit, because the shield is of a width and height to accommodate the cutter arm, the complete unloader can readily be removed for making the described conversion. Without the uncut section of the shield adjacent the door of the structure it would be necessary for the cutter arm to be operatively cutting material during unloader removal.

We claim:

1. A structural member for providing a void in stored material in the bottom of a storage structure to facilitate installation and startup of a mechanical unloading unit within the structure, comprising a disposable shield of a material compatible with that of the stored material to be readily assimilated therein when destroyed by the unloading unit, said shield having a body portion of a height and size to fit over the mechanical unloading unit and a configuration to provide the structural strength required to withstand the pressure of the stored material, and the lower end of the body portion being disposed to be supported on the floor of the storage unit to support the shield therefrom over said unloader.

2. The structure of claim 1, and a supporting flange provided integrally with the lower portion of the body of the shield in engagement with the supporting floor of the storage unit.

3. The structural member of claim 1, in which the material of the shield is of an edible material.

4. The structural member of claim 1, in which the member extends longitudinally for a substantial distance and is half-rounded and of a width to dispose the same over the entire mechanical unloading unit located in a radially extending trough in the floor of the storage structure, thereby permitting loading of the storage structure, with the unloader located in the trough and preventing packing of material onto the unloader.

5. The structural member of claim 1, in which the member is circular and generally hat shaped to dispose the same over a coiled unloader disposed in the bottom of the storage structure, and spaced opening in the body portion of the shield adjacent the supporting floor of the structure to facilitate disposal thereof by said unloader.

6. The structural members of claims 1, in which the shield is provided from a plurality of interlocked sections.